United States Patent
Tamura

(10) Patent No.: US 11,475,099 B2
(45) Date of Patent: Oct. 18, 2022

(54) OPTIMIZATION APPARATUS AND METHOD FOR CONTROLLING THEREOF

(71) Applicant: FUJITSU LIMITED, Kawasaki (JP)

(72) Inventor: Hirotaka Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 734 days.

(21) Appl. No.: 16/513,785

(22) Filed: Jul. 17, 2019

(65) Prior Publication Data
US 2020/0042570 A1 Feb. 6, 2020

(30) Foreign Application Priority Data

Jul. 31, 2018 (JP) .............................. JP2018-143479

(51) Int. Cl.
| | | |
|---|---|---|
| *G06F 17/11* | (2006.01) | |
| *G06N 3/063* | (2006.01) | |
| *G06N 3/08* | (2006.01) | |

(52) U.S. Cl.
CPC ............. *G06F 17/11* (2013.01); *G06N 3/063* (2013.01); *G06N 3/08* (2013.01)

(58) Field of Classification Search
CPC .......... G06F 17/11; G06N 3/063; G06N 3/08; G06N 5/003
USPC .......................................................... 703/2
See application file for complete search history.

(56) References Cited

U.S. PATENT DOCUMENTS

| | | |
|---|---|---|
| 2017/0351947 A1 | 12/2017 | Tamura et al. |
| 2018/0075342 A1 | 3/2018 | Tamura et al. |
| 2019/0130295 A1* | 5/2019 | Okuyama ............... G06F 17/11 |

FOREIGN PATENT DOCUMENTS

| | | | | |
|---|---|---|---|---|
| EP | 3633560 | * | 4/2018 | ............... G06N 5/00 |
| JP | 2017-219948 | | 12/2017 | |
| JP | 2018-041351 | | 3/2018 | |

OTHER PUBLICATIONS

Satoshi Matsubara et al., "Ising-Model Optimizer with Parallel-Trial Bit-Sieve Engine", Proceedings of the 11th International Conference on Complex, Intelligent, and Software Intensive Systems (CISIS-2017), Jul. 10-12, 2017, Torino, Italy, pp. 432-438 (7 pages).

\* cited by examiner

*Primary Examiner* — Juan C Ochoa
(74) *Attorney, Agent, or Firm* — Fujitsu Patent Center

(57) ABSTRACT

In an optimization apparatus, calculation circuits individually calculate a change in energy based on first local field values each associated with one of n bits (n is an integer greater than or equal to 2) amongst a plurality of bits corresponding to spins in an Ising model, values of the n bits, and one or more weight values representing strength of interaction among the n bits. The change in energy is caused by flips of the n bits. An update bit selection circuit selects the n bits for which value update is accepted, based on the magnitude relationship between thermal excitation energy and each of the calculated changes in energy. An update circuit flips the n bits, and also updates, based on the flips of the n bits, second local field values including the first local field values and each associated with the plurality of individual bits.

9 Claims, 11 Drawing Sheets

OPTIMIZATION APPARATUS AND METHOD FOR CONTROLLING THEREOF

CROSS-REFERENCE TO RELATED APPLICATION

This application is based upon and claims the benefit of priority of the prior Japanese Patent Application No. 2018-143479, filed on Jul. 31, 2018, the entire contents of which are incorporated herein by reference.

FIELD

The embodiments discussed herein are related to an optimization apparatus and a method for controlling thereof.

BACKGROUND

Optimization apparatuses using an Ising energy function (sometimes also called Ising machines or Boltzmann machines) are known as techniques for solving multivariable optimization problems, a task for which von Neumann computers are not very efficient. The optimization apparatuses apply the Ising model, a model representing the behavior of magnetic spins, to an optimization problem to be solved.

The optimization apparatuses are capable of simulating, for example, using a neural network. In that case, each of a plurality of bits corresponding to a plurality of spins in the Ising model functions as a neuron for outputting either 0 or 1 according to the value of each of other bits and weight values (also called connection coefficients) each indicating the strength of the interaction of the bit with every other bit. Such an optimization apparatus employs, for example, a stochastic search method using simulated annealing to obtain, as the solution, a combination of the values of individual bits for which the aforementioned energy function (also called a cost function or objective function) finds an energy minimum.

There are conventionally proposed optimization apparatuses for performing simulated annealing by the use of digital circuits, to thereby obtain a combination of individual bits with minimum energy (see, for example, Japanese Laid-open Patent Publications No. 2017-219948 and No. 2018-041351 and Satoshi Matsubara et al., "Ising-Model Optimizer with Parallel-Trial Bit-Sieve Engine", CISIS-2017, pp. 432-438). The conventional optimization apparatuses calculate a change in energy when flipping only one bit at a time and then determine whether to accept the bit flip according to a value obtained by adding a noise value corresponding to a temperature to the change in energy. A bit flip mutation that yields an energy increase is accepted with a predetermined probability, and the lower the temperature, the lower the probability.

However, the conventional optimization apparatuses implement a stochastic search by accepting a flip of only one bit at a time. Therefore, in a situation where the probability of obtaining a bit to be flipped is low, as if at the end of the annealing process where the temperature is lowered, there remains the problem that the speed of searching for an optimal solution is decreased.

SUMMARY

According to one aspect, there is provided an optimization apparatus including a plurality of first calculation circuits each configured to calculate a first change in energy of an Ising model, onto which a computational problem is mapped, based on first local field values each associated with one of n bits (n is an integer greater than or equal to 2) amongst a plurality of bits corresponding to a plurality of spins in the Ising model, values of the n bits, and one or more weight values representing strength of interaction among the n bits, the first change in energy being caused by changes in the values of the n bits; an update bit selection circuit configured to select the n bits for which value update is accepted, based on a magnitude relationship between thermal excitation energy, which is determined based on a temperature parameter input thereto and a random number, and each of the first changes in energy output from the plurality of first calculation circuits, and output first identification information for identifying the selected n bits; and an update circuit configured to change the values of the n bits identified by the first identification information output from the update bit selection circuit, and also update, based on the changes in the values of the n bits, second local field values including the first local field values and each associated with one of the plurality of bits.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
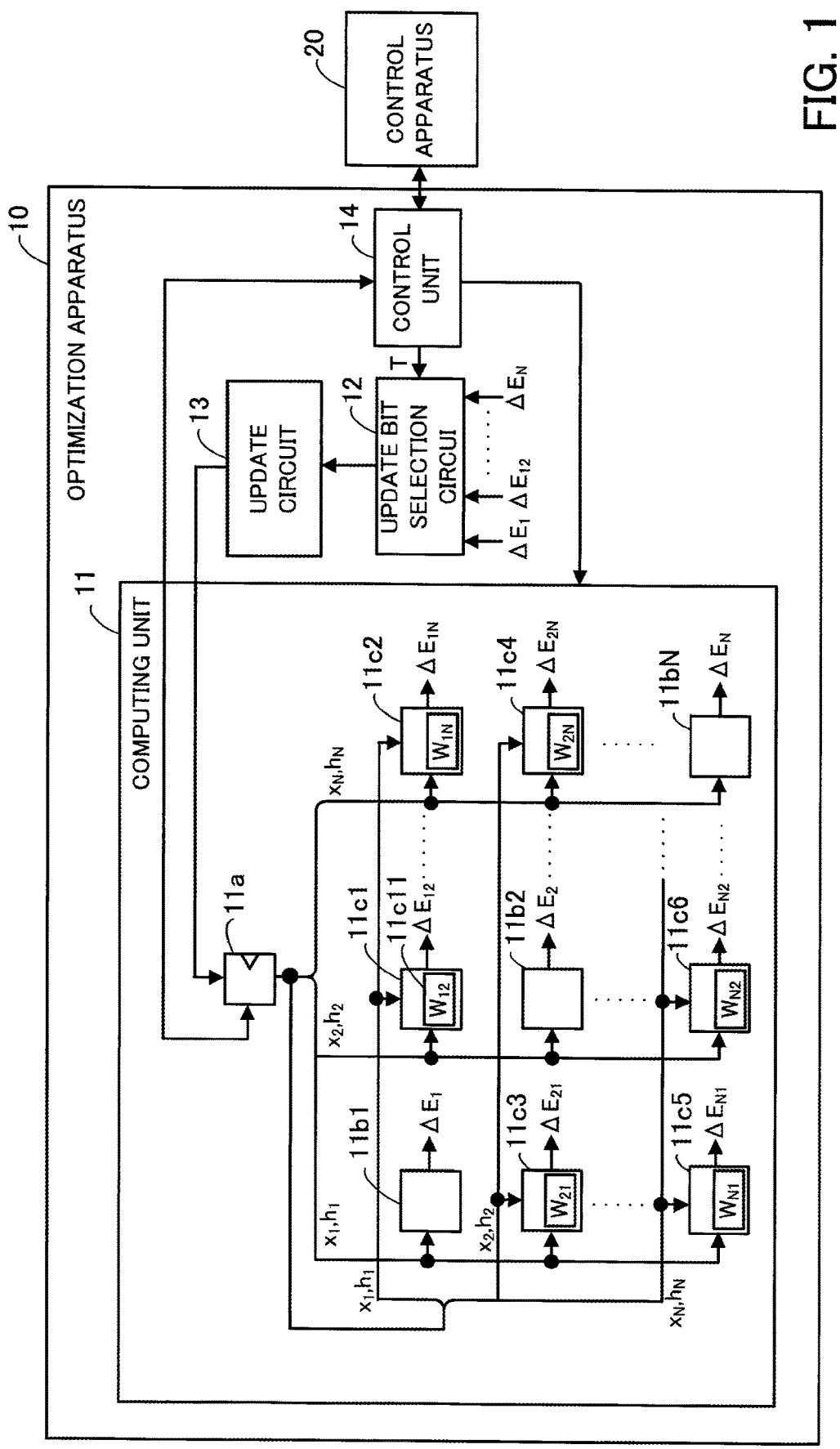
FIG. 1 illustrates an exemplary optimization apparatus according to a first embodiment.

Several embodiments will be described below with reference to the accompanying drawings.

An optimization apparatus described below is capable of exploring states of a neighborhood based on a Hamming distance of n (n is a positive integer greater than or equal to 2) from the current combination (current state) of the value of each of a plurality of bits corresponding to a plurality of spins in the Ising model.

Note that the optimization apparatus solves an optimization problem, such as the travelling salesman problem, by searching for the ground state of the Ising model (the values of individual bits for which the Ising energy function attains its minimum). An Ising energy function E(x) is defined, for example, by the following Expression (1).

$$E(x) = -\sum_{\langle i,j \rangle} W_{ij} x_i x_j - \sum_i b_i x_i \tag{1}$$

The first term on the right side of Expression (1) concerns all possible combinations of two bits selectable from all bits in the Ising model, which are mutually exclusive and collectively exhaustive, and represents the sum of the products of values (either 0 or 1) of two bits of each combination and a connection coefficient of the combination. Here, $x_i$ and $x_j$ are variables (also called state variables) representing the values of the i-th and j-th bits, respectively, and $W_{ij}$ is the weight value representing the strength of the interaction between the i-th and j-th bits. Note that $W_{ii}=0$. In addition, it is often the case that $W_{ij}=W_{ji}$ (i.e., coefficient matrices of weight values are often symmetric).

The second term on the right side represents the sum of the products of a bias coefficient of each of all the bits and the value of the bit. Here, $b_i$ is the bias coefficient of the i-th bit.

When the value of the variable $x_i$ is changed to $1-x_i$, an increase in the variable $x_i$ is expressed as: $\Delta x_i=(1-x_i)-x_i=1-2x_i$. A change in energy $\Delta E_i$ associated with a spin flip (a change in the value) of the i-th bit is defined by the following Expression (2).

$$\Delta E_i = E(x)|_{x_i \to 1-x_i} - E(x) = -\Delta x_i \left( \sum_j W_{ij} x_j + b_i \right) = -\Delta x_i h_i \tag{2}$$

In Expression (2), $\Delta x_i$ takes $-1$ when the variable $x_i$ of the i-th bit changes from 1 to 0, and takes 1 when the variable $x_i$ changes from 0 to 1. Note that $h_i$ is referred to as the local field, and the change in energy $\Delta E_i$ is given by adding a positive or negative sign to the local field $h_i$ (i.e., multiplying the local field $h_i$ by +1 or −1) according to $\Delta x_i$. A change in the local field $h_i$ when the variable $x_j$ of the j-th bit changes from 0 to 1 is defined as $\Delta h_i^{(j)}=+W_{ij}$, and a change in the local field $h_i$ when the variable $x_j$ changes from 1 to 0 is defined as $\Delta h_i^{(j)}=-W_{ij}$. Similarly, a change in the local field $h_j$ of the j-th bit when the variable $x_i$ changes is defined as $\Delta h_j^{(i)}=\Delta x_i W_{ij}$.

Therefore, a change in energy when the variables $x_i$ and $x_j$ are sequentially flipped (i.e., an energy change associated with a transition to the state of a neighborhood based on a Hamming distance of two) is defined by the following Expression (3). If $W_{ij}=W_{ji}$ is true, the change in energy is independent of the order of the variables $x_i$ and $x_j$ being flipped. Therefore, either sequence of flips of the variables $x_i$ and $x_j$ leads to the same change in energy; however, flipping of the variables $x_i$ and $x_j$ in the stated order and flipping of the variables $x_j$ and $x_i$ in the stated order are treated as different events because subsequent selections are probabilistic operations.

$$\Delta E_{ij} = -\Delta x_i h_i - \Delta x_j (h_j + \Delta x_i W_{ij}) \tag{3}$$
$$= -\Delta x_i h_i - \Delta x_j h_j - \Delta x_i \cdot \Delta x_j \cdot W_{ij}$$

First, an optimization apparatus according to a first embodiment is described which is capable of exploring states of a neighborhood based on a Hamming distance of two.

(a) First Embodiment

FIG. 1 illustrates an exemplary optimization apparatus according to the first embodiment.

An optimization apparatus 10 of FIG. 1 includes a computing unit 11, an update bit selection circuit 12, and an update circuit 13.

The computing unit 11 includes a retaining unit 11a for retaining values of individual N bits (variables $x_1, x_2, \ldots,$ and $x_N$) and local fields $h_1, h_2, \ldots,$ and $h_N$ of the individual bits; and calculation circuits arranged in an N-by-N matrix. N is the number of bits corresponding to the number of spins in an Ising model which is applied to an optimization problem to be solved.

The retaining unit 11a is, for example, a register or static random access memory (SRAM).

Amongst the N-by-N calculation circuits, calculation circuits 11b1, 11b2, . . . , and 11bN on the diagonal of the matrix individually calculate a change in energy that occurs when a transition takes place from the current state to a state of a neighborhood based on a Hamming distance of one (hereinafter simply referred to as "1-Hamming distance neighborhood state").

For example, the calculation circuit 11b1 calculates, using Expression (2), a change in energy $\Delta E_1$ of the Ising model, associated with a flip of the variable $x_1$, based on the value of the first bit (the variable $x_1$) and the value of the local field $h_1$ corresponding to the first bit. The calculation circuit 11b1 outputs as the change in energy $\Delta E_1$, for example, a value obtained by multiplying the local field $h_1$ by +1 when the variable $x_1$ before the flip is 1, and a value obtained by multiplying the local field $h_1$ by −1 when the variable $x_1$ before the flip is 0. The calculation circuit 11b1 may be implemented using a multiplier and a selector for selecting between +1 and −1 to be multiplied to the local field $h_1$ according to the value of the variable $x_1$ before the flip. The same goes for each of the remaining calculation circuits 11b2 to 11bN.

Note however that the calculation circuits 11b1 to 11bN may be excluded if the optimization apparatus 10 always explores states of a neighborhood based on a Hamming distance of two (hereinafter simply referred to as "2-Hamming distance neighborhood states").

Amongst the N-by-N calculation circuits, calculation circuits other than the calculation circuits 11b1 to 11bN (such as calculation circuits 11c1, 11c2, 11c3, 11c4, 11c5, and 11c6) individually calculate a change in energy that occurs when a transition takes place from the current state to a 2-Hamming distance neighborhood state.

For example, the calculation circuit 11c1 calculates a change in energy $\Delta E_{12}$ of the Ising model, associated with sequential flips of the first and second bits (the variables $x_1$ and $x_2$). Specifically, the calculation circuit 11c1 calculates, using Expression (3), the change in energy $\Delta E_{12}$ caused by the sequential flips of the variables $x_1$ and $x_2$, based on the values of the variables $x_1$ and $x_2$, those of the local fields $h_1$ and $h_2$ corresponding to the first and second bits, and a weight value $W_{12}$. The weight value $W_{12}$ is stored in a storing unit 11c11 (e.g. a register or SRAM) in the calculation circuit 11c1.

The calculation circuit 11c1 calculates $-\Delta x_1 h_1$, for example, by multiplying the local field $h_1$ by +1 when the variable $x_1$ before the flip is 1, and multiplying the local field $h_1$ by $-1$ when the variable $x_1$ before the flip is 0. Similarly, the calculation circuit 11c1 calculates $-\Delta x_2 h_2$ by multiplying the local field $h_2$ by +1 when the variable $x_2$ before the flip is 1, and multiplying the local field $h_2$ by $-1$ when the variable $x_2$ before the flip is 0. Further, the calculation circuit 11c1 multiplies the weight value $W_{12}$ by either $-1$ or $+1$ according to the values of the variables $x_1$ and $x_2$ before the flips. Then, the calculation circuit 11c1 adds up the three resulting products to obtain $\Delta E_{12}$. The calculation circuit 11c1 thus described may be implemented using a selector, a multiplier, and an adder. The same goes for other calculation circuits (such as the calculation circuits 11c2 to 11c6).

Note that the above-described arrangement of the N-by-N calculation circuits is merely an example. There is no need to arrange the calculation circuits 11b1 to 11bN on the diagonal of the matrix, and they may be all arranged in a single row or column instead.

The update bit selection circuit 12 inputs thereto a temperature parameter T and changes in energy $\Delta E_1$, $\Delta E_{12}$, . . . , and $\Delta E_N$ output from the individual N-by-N calculation circuits. Then, the update bit selection circuit 12 selects two bits (or one bit) for which value update is accepted, based on the magnitude relationship between thermal excitation energy, which is determined by the temperature parameter T and a random number, and each of the individual changes in energy $\Delta E_1$, $\Delta E_{12}$, . . . , and $\Delta E_N$. Further, the update bit selection circuit 12 outputs identification information of the selected two bits (or one bit). Details of the update bit selection circuit 12 are described later with an example.

The update circuit 13 sequentially flips the two bits identified by the identification information output from the update bit selection circuit 12, and also updates the values of the local fields $h_1$ to $h_N$ based on the two bit-flips. In the case where the identification information output from the update bit selection circuit 12 is associated with only one bit, the update circuit 13 flips the one bit identified by the identification information, and then updates the values of the local fields $h_1$ to $h_N$ based on the one bit-flip. The individual updated values are retained by the retaining unit 11a.

Assuming, for example, that the update bit selection circuit 12 outputs identification information for identifying the k-th and l-th bits, the update circuit 13 sequentially flips the two bits, as described below, and also updates the values of the local fields $h_1$ to $h_N$.

If k≠1, the update circuit 13 flips the k-th bit (a variable $x_k$) to $1-x_k$. Then, the update circuit 13 updates local fields $h_i$ (i=1, 2, . . . , and N (however i≠k)) with $h_i + W_{ki} \cdot \Delta x_k$ ($\Delta x_k = 1 - 2x_k$). In addition, the update circuit 13 flips the l-th bit (a variable $x_l$) to $1-x_l$. Then, the update circuit 13 further updates the updated local fields $h_i$ (i=1 to N (however i≠1)) with $h_i + W_{li} \cdot \Delta x_l$ ($\Delta x_l = 1 - 2x_l$).

If k=l, the update circuit 13 flips the variable $x_k$ to $1-x_k$. Then, the update circuit 13 updates the local fields $h_i$ (i=1 to N (however i≠k)) with $h_i + W_{ki} \cdot \Delta x_k$.

It is possible to run such calculations of the individual local fields $h_i$ (i=1 to N) in parallel, as defined by the following Expression (4).

$$\text{WHEN } k = 1 \quad \frac{h_1, h_2, \ldots, h_N + \text{CURRENT VALUES}}{\Delta x_k(W_{k1}, W_{k2}, \ldots, W_{kN})} \quad (4)$$
$$\frac{}{h_1, h_2, \ldots, h_N} \quad \text{NEXT VALUES}$$

$$\text{WHEN } k \neq 1 \quad \frac{\begin{array}{c} h_1, h_2, \ldots, h_N + \\ \Delta x_k(W_{k1}, W_{k2}, \ldots, W_{kN}) + \\ \Delta x_l(W_{l1}, W_{l2}, \ldots, W_{lN}) \end{array}}{h_1, h_2, \ldots, h_N} \quad \begin{array}{c}\text{CURRENT VALUES}\\ \\ \\ \text{NEXT VALUES}\end{array}$$

To perform the above-described update process, the update circuit 13 acquires, for example, the current variables $x_i$ (i=1 to N) and the values of the local fields $h_i$ from the retaining unit 11a and the weight values $W_{ki}$ and $W_{li}$ from storing units (such as the storing unit 11c11) inside the calculation circuits. The update circuit 13 may be implemented using a selector, a multiplier, and an adder.

The control unit 14 exchanges information with a control apparatus 20 (e.g. a personal computer (PC)) external to the optimization apparatus 10. For example, the control unit 14 receives, from the control apparatus 20, the weight values $W_{ij}$ and bias coefficients $b_i$ that define the Ising model, and then stores each weight value $W_{ij}$ in a storing unit of a corresponding calculation circuit in the computing unit 11 (for example, the weight value $W_{12}$ is stored in the storing unit 11c11 of the calculation circuit 11c1). In addition, the control unit 14 may set initial values (e.g. all 0's) of the variables $x_i$ (i=1 to N) in the retaining unit 11a, and also calculate initial values of the local fields $h_i$ based on the initial values of the variables $x_i$, the weight values $W_{ij}$, and the bias coefficients $b_i$ and then set them in the retaining unit 11a. Further, the control unit 14 receives, from the control apparatus 20, annealing conditions (e.g. the maximum and minimum of the temperature parameter T and information on the manner of reducing the value of the temperature parameter T), and sets the temperature parameter T in the update bit selection circuit 12 based on the annealing conditions. According to the annealing conditions, the control unit 14 gradually decreases the value of the temperature parameter T. In addition, the control unit 14 acquires, from the retaining unit 11a, the values of the individual bits (the variables $x_i$ (i=1 to N)) obtained when the value of the temperature parameter T has been decreased a predetermined number of times (or when the temperature parameter T has reached the minimum) and transmits these values to the control apparatus 20 as the solution.

The control unit 14 may be implemented using an electronic circuit designed for specific use, such as an application specific integrated circuit (ASIC) or a field programmable gate array (FPGA). Note that the control unit 14 may instead be a processor, such as a central processing unit (CPU) or digital signal processor (DSP). In that case, the processor performs the above-described process by executing programs stored in memory (not illustrated). Further, the functions of the control unit 14 may be included in the control apparatus 20.

Figure 2:
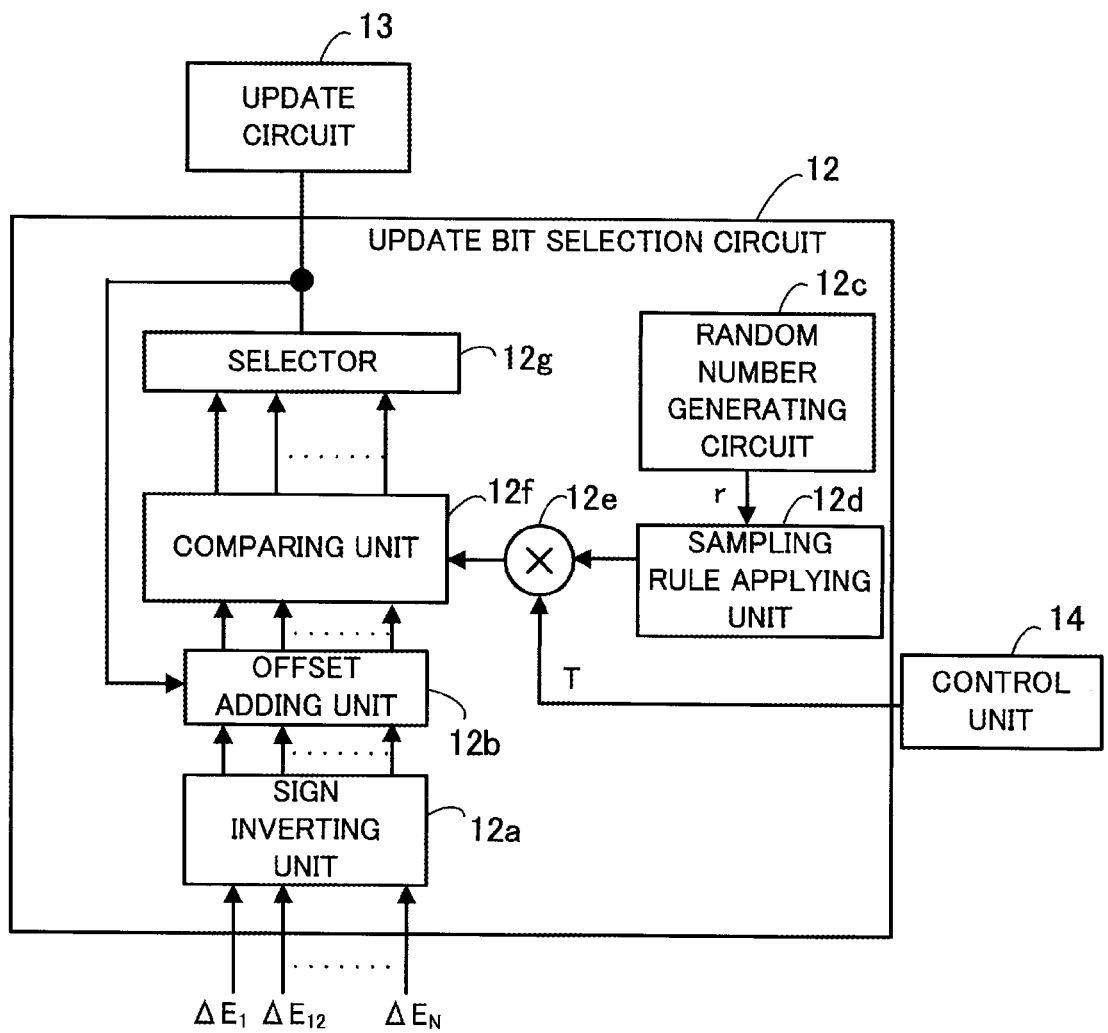
FIG. 2 illustrates an exemplary update bit selection circuit.

FIG. 2 illustrates an exemplary update bit selection circuit.

The update bit selection circuit 12 includes a sign inverting unit 12a, an offset adding unit 12b, a random number generating circuit 12c, a sampling rule applying unit 12d, a multiplier 12e, a comparing unit 12f, and a selector 12g.

The sign inverting unit 12a multiplies each of the changes in energy $\Delta E_1$, $\Delta E_{12}$, . . . , and $\Delta E_N$ by $-1$ to invert its sign.

The offset adding unit 12b adds an offset value to each of the values ($-\Delta E_1, -\Delta E_{12}, \ldots,$ and $-\Delta E_N$) output from the sign inverting unit 12a. The offset adding unit 12b increases the offset values when a flag included in a status signal output from the selector 12g (to be described later) indicates that no state transition is accepted (i.e., when no state transition is made). On the other hand, the offset adding unit 12b sets the offset values to 0 when the flag indicates the acceptance of a state transition (i.e., when a state transition takes place). Larger offset values make a state transition more likely to be accepted and, therefore, facilitate escaping from a local solution if the current state is trapped therein.

The random number generating circuit 12c generates a uniform random number r between 0 (inclusive) and 1 (inclusive).

The sampling rule applying unit 12d outputs a value based on a sampling rule (Metropolis or Gibbs sampling) for simulated annealing.

It has been established that, when implementing simulated annealing, the state will reach the optimal solution in the limit of infinite time (infinite number of iterations) if an acceptance probability $A(\Delta E, T)$ of accepting a state transition causing a change in energy $\Delta E$ is defined as the following Expression (5).

$$A(\Delta E, T) = f(-\Delta E/T) \tag{5}$$

$$f(-\Delta E/T) = \begin{cases} \min[1, \exp(-\Delta E/T)] & \text{METROPOLIS} \\ 1/[1 + \exp(\Delta E/T)] & \text{GIBBS SAMPLING} \end{cases}$$

In Expression (5), T is the aforementioned temperature parameter T.

In the case of using the acceptance probability $A(\Delta E, T)$ defined by Expression (5), when steady state is reached after a sufficient number of iterations, the occupation probability of each state follows a Boltzmann distribution reflecting thermal equilibrium in thermodynamics. Then, because the occupation probabilities of low-energy states increase when the temperature is gradually reduced from a high value, a sufficient reduction in temperature ought to lead to a state of low energy. These state transitions are analogous to those observed during annealing of materials, and this technique is therefore called "simulated annealing". Simulated annealing probabilistically accepting transitions to an increased energy state corresponds to thermal excitation in physics.

A circuit for outputting a flag equal to 1, indicating that a state transition causing the change in energy $\Delta E$ is accepted at the acceptance probability $A(\Delta E, T)$, may be implemented using a comparator for outputting a value based on comparison between $f(-\Delta E/T)$ of Expression (5) and the uniform random number r.

Note however that the same function may be implemented with the following modification. When a monotonically increasing function is applied to two numbers, their magnitude relation remains unchanged. Therefore, application of the same monotonically increasing function to two inputs of a comparator produces no change in the output of the comparator. For example, as a monotonically increasing function to be applied to $f(-\Delta E/T)$, the inverse function of $f(-\Delta E/T)$, i.e., $f^{-1}(-\Delta E/T)$, may be used, and as a monotonically increasing function to be applied to the uniform random number r, $f^{-1}(r)$ may be used which is obtained by substituting $-\Delta E/T$ in $f^{-1}(-\Delta E/T)$ with r. It is thus seen that a circuit for outputting 1 when $-\Delta E/T > f^{-1}(r)$ may be used in place of the comparator having the aforementioned function.

Further, since the temperature parameter T takes a positive value, the circuit may be configured to output 1 when $-\Delta E > T \cdot f^{-1}(r)$.

The sampling rule applying unit 12d uses a conversion table for converting the uniform random number r input thereto into a value of the above-mentioned $f^{-1}(r)$ and outputs the value of $f^{-1}(r)$. In the case of applying Metropolis sampling, $f^{-1}(r)$ is $\log(r)$. The conversion table is stored in memory, such as random access memory (RAM) or flash memory.

The multiplier 12e outputs a product ($T \cdot f^{-1}(r)$) of the temperature parameter T, supplied from the control unit 14, and $f^{-1}(r)$. $T \cdot f^{-1}(r)$ corresponds to the thermal excitation energy.

The comparing unit 12f compares $T \cdot f^{-1}(r)$ against the addition result obtained by the offset adding unit 12b for each of the changes in energy $\Delta E_1, \Delta E_{12}, \ldots,$ and $\Delta E_N$. Then, the comparing unit 12f returns 1 as a flag for each addition result larger than $T \cdot f^{-1}(r)$ and 0 as a flag for each addition result smaller than $T \cdot f^{-1}(r)$.

Based on the flags associated with the individual changes in energy $\Delta E_1, \Delta E_{12}, \ldots,$ and $\Delta E_N$, the selector 12g outputs a status signal that includes identification information of two bits (or one bit), for which state transition is accepted, and a flag. The selector 12g thus described is implemented using an $N^2$-to-1 selector. Note that in the case where all the flags associated with the changes in energy $\Delta E_1, \Delta E_{12}, \ldots,$ and $\Delta E_N$ are set to 0, the flag included in the status signal output from the selector 12g is also set to 0.

Figure 3:
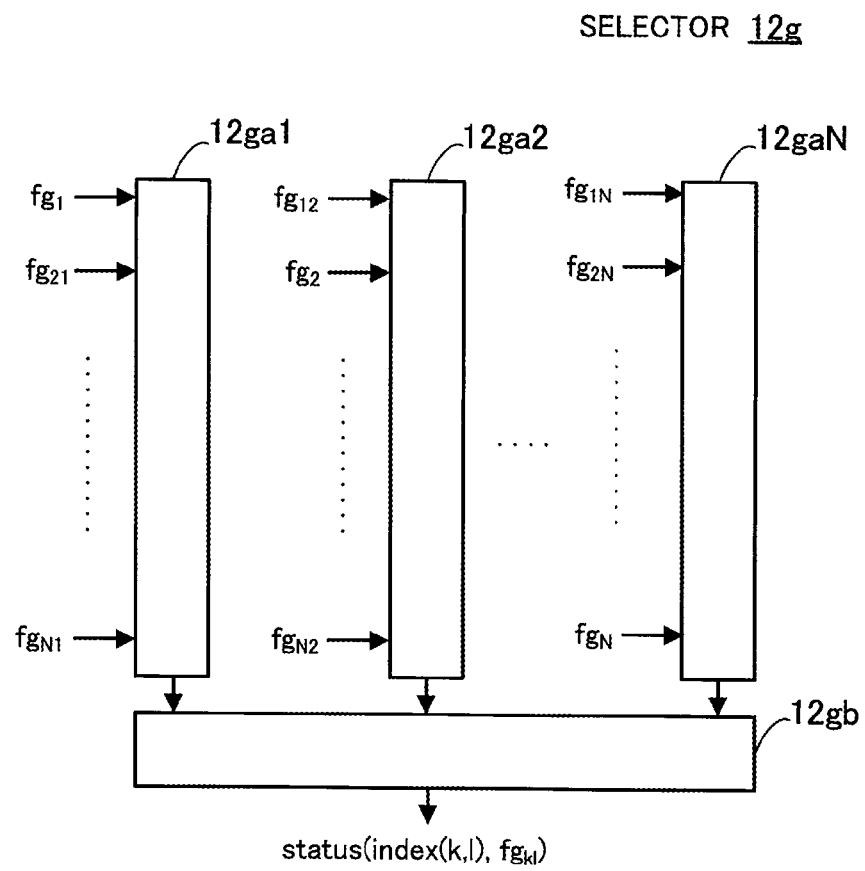
FIG. 3 illustrates an exemplary $N^2$-to-1 selector.

FIG. 3 illustrates an exemplary $N^2$-to-1 selector.

The selector 12g, which is an $N^2$-to-1 selector, includes N N-to-1 selectors 12ga1, 12ga2, …, and 12gaN, and a single N-to-1 selector 12gb.

The N-to-1 selectors 12ga1 to 12gaN individually receive N flags. For example, the N-to-1 selector 12ga1 receives flags $fg_1, fg_{21}, \ldots,$ and $fg_{N1}$ associated with the changes in energy $\Delta E_1, \Delta E_{21}, \ldots,$ and $\Delta E_{N1}$. Then, the N-to-1 selector 12ga1 preferentially selects one flag having a value of 1 from the flags $fg_1$ to $fg_{N1}$ and outputs the selected flag and identification information corresponding to the flag. That is, the identification information is generated by the N-to-1 selector 12ga1. Examples of such an N-to-1 selector generating identification information are disclosed, for example, in Japanese Laid-open Patent Publication No. 2018-041351. The same goes for each of the N-to-1 selectors 12ga2 to 12gaN.

The N-to-1 selector 12gb receives the flags and identification information output from the N-to-1 selectors 12ga1 to 12gaN, and preferentially selects one flag having a value of 1. Then, the N-to-1 selector 12gb outputs a status signal (status) including a flag $fg_{kl}$ selected and identification information (index(k,l)) corresponding to the flag $fg_{kl}$.

Next described is an example of how the optimization apparatus 10 according to the first embodiment operates.

Figure 4:
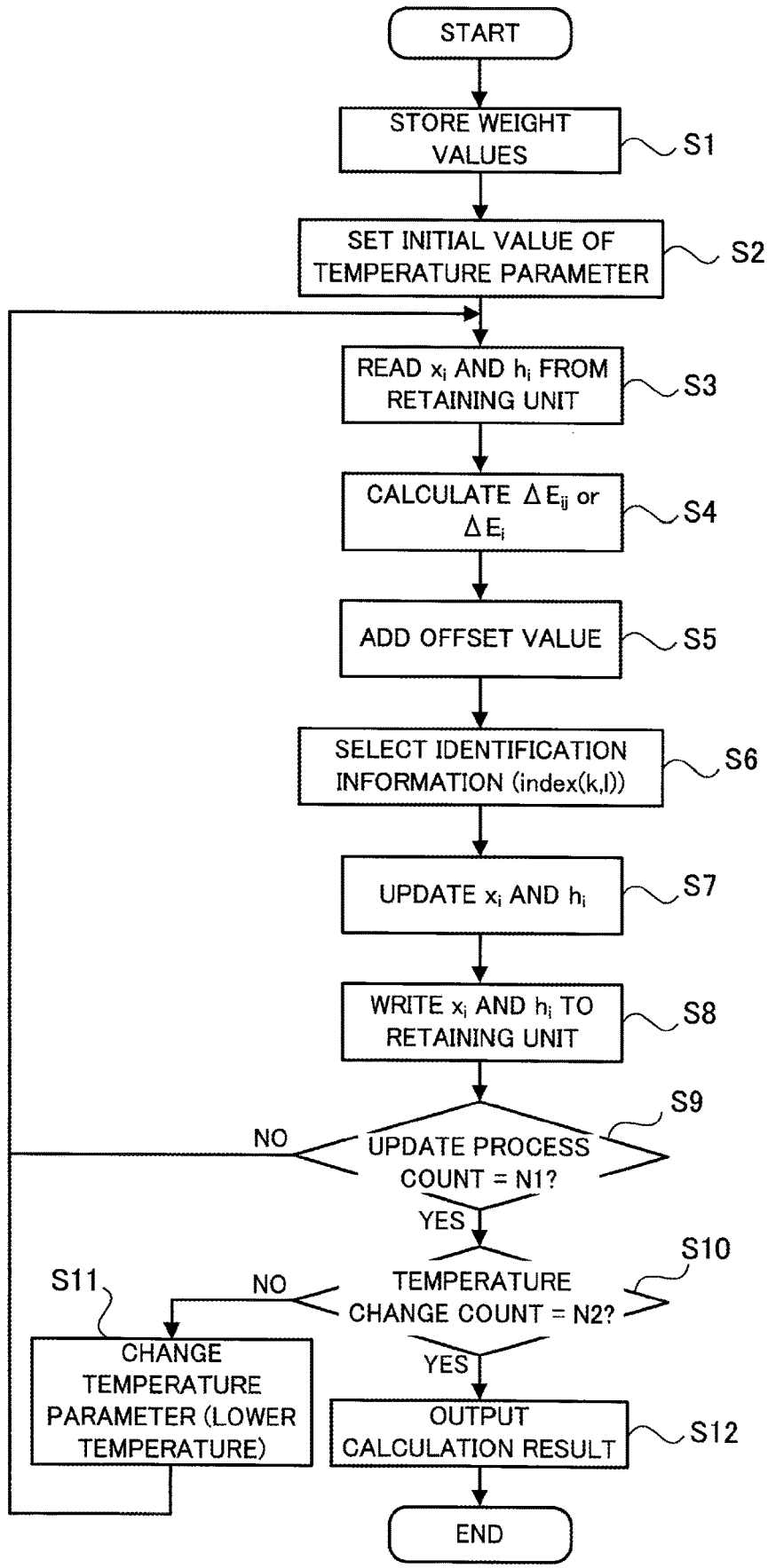
FIG. 4 is a flowchart illustrating an exemplary operation flow of the optimization apparatus according to the first embodiment.

FIG. 4 is a flowchart illustrating an exemplary operation flow of the optimization apparatus according to the first embodiment.

First, the control unit 14 stores each weight value $W_{ij}$ received from the control apparatus 20 in a storing unit of a corresponding calculation circuit in the computing unit 11 (for example, the weight value $W_{12}$ is stored in the storing unit 11c11 of the calculation circuit 11c1) (step S1).

In addition, the control unit 14 sets an initial value of the temperature parameter T on the update bit selection circuit 12 based on annealing conditions received from the control apparatus 20 (step S2).

Each of the N-by-N calculation circuits reads, from the retaining unit 11a, values of the variable $x_i$ and the local field $h_i$ used in calculation of a change in energy, for which the calculation circuit is responsible (step S3).

Then, the N-by-N calculation circuits individually calculate the change in energy $\Delta E_{ij}$ or $\Delta E_i$, as described above (step S4).

The update bit selection circuit 12 receives the change in energy $\Delta E_{ij}$ or $\Delta E_i$ from each of the N-by-N calculation circuits, then inverts the sign of the received change in energy $\Delta E_{ij}$ or $\Delta E_i$, and adds an offset value to the change in energy $\Delta E_{ij}$ or $\Delta E_i$ with the inverted sign (step S5).

Then, the update bit selection circuit 12 selects the identification information (index(k, l)) that identifies two bits (or a bit) for which state transition is accepted, through the above-described procedure (step S6).

The update circuit 13 flips the two bits or one bit (the variables $x_i$ (i=k, l)) identified by the identification information selected and output from the update bit selection circuit 12. In addition, the update circuit 13 updates the values of the local fields $h_i$ (i=1 to N) based on the bit flips or flip through the above-described procedure (step S7).

Each value of the variables $x_i$ and the local fields $h_i$ after the update is written to the retaining unit 11a (step S8).

The control unit 14 determines whether the update process from steps S3 to S8 has been repeated a predetermined number of times N1 (step S9). If the update process has yet to be repeated the predetermined number of times N1, the update process from steps S3 to S8 is repeated.

If the update process has been repeated the predetermined number of times N1, the control unit 14 determines whether the number of changes in the temperature parameter (temperature change count) has reached a predetermined number N2 (step S10).

If the temperature change count has yet to reach the predetermined number N2, the control unit 14 changes the temperature parameter (lowers the temperature) (step S11). The predetermined number of times N1, the predetermined number N2, and how to change the temperature parameter (e.g. the decrement level of the temperature in each change) are determined based on the annealing conditions. After step S11, the operation returns to step S3 to be repeated.

If the temperature change count reaches the predetermined number N2, the control unit 14 acquires the value of each bit (the variables $x_i$ (i=1 to N)) at this point of time from the retaining unit 11a and transmits (outputs) these values to the control apparatus 20 as the solution (calculation result) (step S12).

According to the above-described optimization apparatus 10 of the first embodiment, judgement on accepting an update of the values of two bits is made based on a change in energy caused by sequential flips of the two bits, which allows exploring 2-Hamming distance neighborhood states. Herewith, it is possible to prevent slowdown in the speed of searching for an optimal solution even in a situation where the probability of obtaining a bit to be flipped is low, as if at the end of the annealing process where the temperature is lowered. In addition, in the case where the update process count and the temperature change count are predefined, as in the above-described case, the prevention of slowdown in the searching speed increases the accuracy of a solution found within the bounds of the predefined counts.

The weight values $W_{ij}$ may be stored in memory different from the storing unit 11c11 and the like; however, storing each weight value $W_{ij}$, for example, in the storing unit 11c11 of the circuit in charge of calculating the corresponding change in energy $\Delta E_{ij}$ reduces memory access involved in the calculation of the change in energy $\Delta E_{ij}$.

(b) Second Embodiment

Amongst the N-by-N calculation circuits, each calculation circuit other than those located on the diagonal calculates the change in energy $\Delta E_{ij}$ caused by sequential two bit-flips, as described above. In the course of calculating the change in energy $\Delta E_{ij}$, each of the off-diagonal calculation circuits may calculate the value of a local field associated with a first bit-flip. The values of local fields $h_1^{(i)}, h_2^{(i)}, \ldots,$ and $h_N^{(i)}$ of the individual bits, associated with a flip of the i-th bit (the variable $x_i$) are defined by the following Expression (6).

$$\begin{array}{ll} h_1, h_2, \ldots, h_N + & \text{CURRENT VALUES} \\ \underline{\Delta x_i(W_{i1}, W_{i2}, \ldots, W_{iN})} & \\ h_1^{(i)}, h_2^{(i)}, \ldots, h_N^{(i)} & \text{NEXT VALUES} \end{array} \quad (6)$$

In an optimization apparatus according to a second embodiment described below, N-by-N calculation circuits have a function of calculating the values of the aforementioned local fields $h_1^{(i)}, h_2^{(i)}, \ldots,$ and $h_N^{(i)}$ (i=1 to N).

Figure 5:
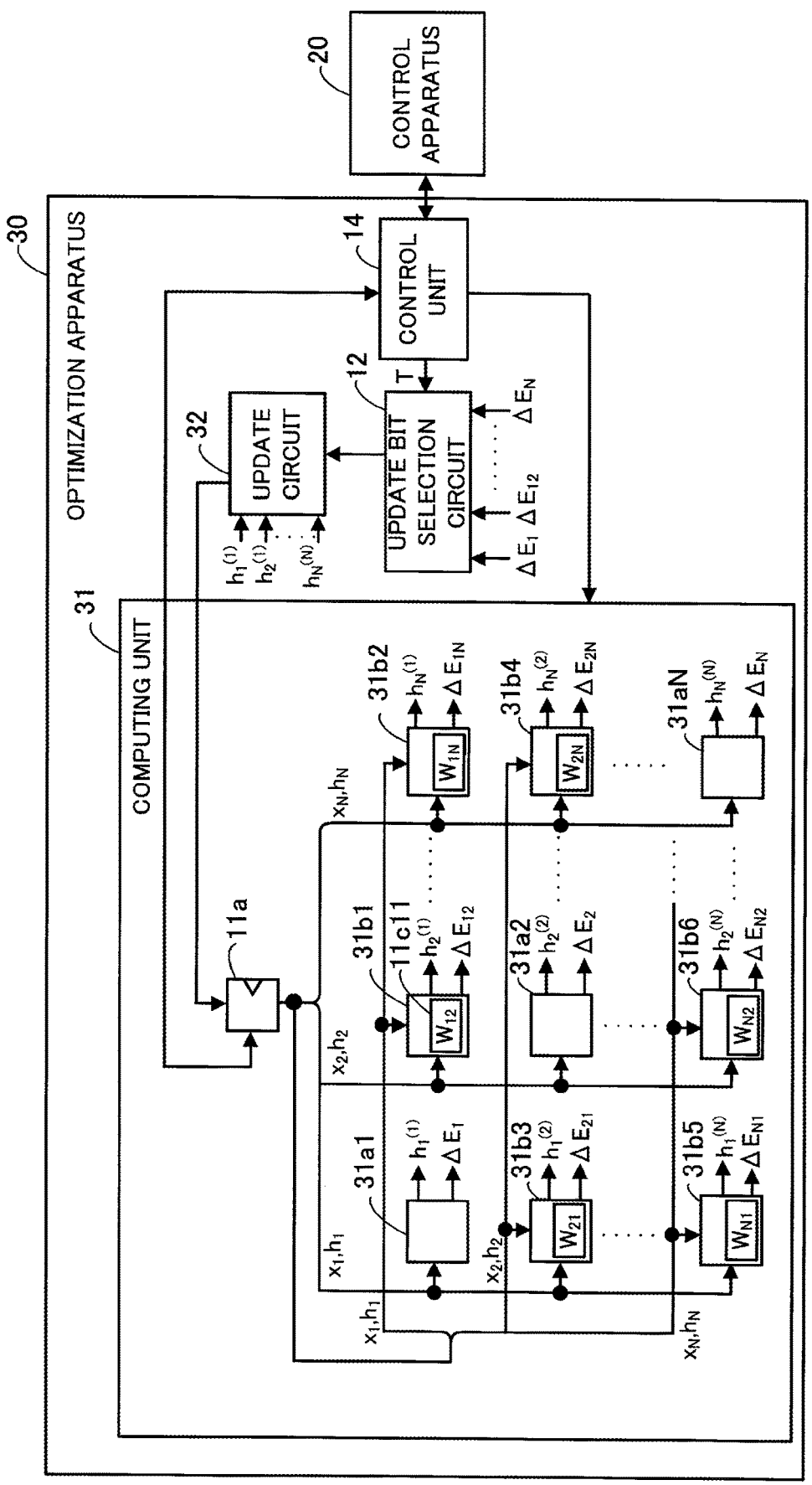
FIG. 5 illustrates an exemplary optimization apparatus according to a second embodiment.

FIG. 5 illustrates an exemplary optimization apparatus according to the second embodiment. In FIG. 5, like reference numerals refer to identical components of the optimization apparatus 10 according to the first embodiment, depicted in FIG. 1.

An optimization apparatus 30 according to the second embodiment differs from the optimization apparatus 10 of the first embodiment in a computing unit 31 and an update circuit 32.

In the optimization apparatus 30, N-by-N calculation circuits of the computing unit 31 calculate the values of the local fields $h_1^{(i)}, h_2^{(i)}, \ldots,$ and $h_N^{(i)}$, and further calculate the changes in energy $\Delta E_1, \Delta E_{12}, \ldots,$ and $\Delta E_N$ based on the values of the local fields $h_1^{(i)}, h_2^{(i)}, \ldots,$ and $h_N^{(i)}$.

Amongst the N-by-N calculation circuits, calculation circuits 31a1, 31a2, and 31aN on the diagonal of the matrix output the values of local fields $h_1^{(i)}, h_2^{(2)}, \ldots,$ and $h_N^{(N)}$), respectively. Note that each weight value $W_{ii}$ equals to 0. Therefore, according to Expression (6), the values of the local fields $h_1^{(1)}, h_2^{(2)}, \ldots,$ and $h_N^{(N)}$ are the same as those of the current local fields $h_1, h_2, \ldots,$ and $h_N$ read by the calculation circuits 31a1, 31a2, . . . , and 31aN from the retaining unit 11a. Hence, the calculation circuits 31a1, 31a2, . . . , and 31aN individually calculate the change in energy $\Delta E_i$ based on the values of the local field $h_i$ and the variable $x_i$ in the same manner as done by the calculation circuits 11b1, 11b2, . . . , and 11bN of the optimization apparatus 10 according to the first embodiment.

Note however that the calculation circuits 31a1 to 31aN may be excluded if the optimization apparatus 30 always searches 2-Hamming distance neighborhood states.

Amongst the N-by-N calculation circuits, calculation circuits other than the calculation circuits 31a1 to 31aN (such as calculation circuits 31b1, 31b2, 31b3, 31b4, 31b5, and 31b6) individually calculate the value of a local field $h_j^{(i)}$ (i≠j).

For example, the calculation circuit 31b1 obtains $\Delta x_1 W_{12}$ by multiplying the weight value $W_{12}$ stored therein by $\Delta x_1$, which is either +1 or −1 depending on the value of the variable $x_1$ read from the retaining unit 11a. Further, the calculation circuit 31b1 adds $\Delta x_1 W_{12}$ to the value of the local field $h_2$ read from the retaining unit 11a, to thereby calculate the value of the local field $h_2^{(1)}$.

In addition, amongst the N-by-N calculation circuits, each of the off-diagonal calculation circuits (those other than the calculation circuits 31a1 to 31aN) calculates the change in energy $\Delta E_{ij}$ (i≠j) based on the values of the local field $h_j^{(i)}$ (i≠j), $h_i$, and the variables $x_i$ and $x_j$, using the following Expression (7).

$$\Delta E_{ij} = -\Delta x_i h_i - \Delta x_j h_j^{(i)} \qquad (7)$$

For example, the calculation circuit 31b1 obtains $-\Delta x_1 h_1$ by multiplying the value of the local field $h_1$, read from the retaining unit 11a, by $-\Delta x_1$. Further, the calculation circuit 31b1 obtains $-\Delta x_2 h_2^{(1)}$ by multiplying the value of the calculated value of the local field $h_2^{(1)}$ by $-\Delta x_2$, which is either +1 or −1 depending on the value of the variable $x_2$ read from the retaining unit 11a. Then, the calculation circuit 31b1 adds the $-\Delta x_1 h_1$ and $-\Delta x_2 h_2^{(1)}$, to obtain the change in energy $\Delta E_{12}$.

The calculation circuit 31b1 thus described is implemented using a selector, a multiplier, and an adder. The same goes for each of the remaining off-diagonal calculation circuits (such as the calculation circuits 31b2 to 31b6).

The update circuit 32 flips two bits (or a bit) identified by identification information output from the update bit selection circuit 12 and also updates the values of the local fields $h_1$ to $h_N$ in the same manner as done by the update circuit 13 of the optimization apparatus 10 according to the first embodiment.

Note however that the update circuit 32 selects, based on the identification information, one of the values of the local fields $h_1^{(i)}$, $h_2^{(i)}$, ..., and $h_N^{(i)}$ (i=1 to N) calculated by the N-by-N calculation circuits, and updates the values of the local fields $h_1$ to $h_N$ using the selected value.

For example, in the case where the update bit selection circuit 12 outputs identification information for identifying the k-th and l-th bits, the update circuit 32 sequentially flips the two bits, as described below, and also updates the values of the local fields $h_1$ to $h_N$.

If k≠l, the update circuit 32 flips the k-th bit (the variable $x_k$) to $1-x_k$ and the l-th bit (the variable $x_l$) to $1-x_l$. In addition, the update circuit 32 updates the local fields $h_i$ (i=1, 2, ..., and N) with $h_i^{(k)} + W_{li} \cdot \Delta x_l$ ($\Delta x_l = 1 - 2x_l$).

If k=l, the update circuit 32 flips the variable $x_k$ to $1-x_k$. Then, the update circuit 32 updates the local fields $h_i$ with $h_i^{(k)}$.

In performing the above-described update process, the update circuit 32 uses the values of the local fields $h_1^{(i)}$, $h_2^{(i)}$, ..., and $h_N^{(i)}$, which eliminates the need of reading weight values $W_{ki}$. This in turn reduces memory access further compared to the optimization apparatus 10 according to the first embodiment.

The flow of the computing process performed by the optimization apparatus 30 of the second embodiment is broadly similar to that illustrated in FIG. 4. The difference is that a step of calculating the local fields $h_1^{(i)}$, $h_2^{(i)}$, ..., and $h_N^{(i)}$ described above is added between steps S3 and S4 of FIG. 4.

The above-described optimization apparatus 30 of the second embodiment achieves the same effect as the optimization apparatus 10 of the first embodiment, and further realizes a reduction in memory access as described above.

(c) Third Embodiment

The embodiments described above are directed to the optimization apparatuses 10 and 30 capable of exploring 2-Hamming distance neighborhood states. An optimization apparatus according to a third embodiment is augmented to expand the search space, allowing exploring states of a neighborhood based on a Hamming distance of three or more.

A change in energy caused by sequential flips of the variables $x_i$, $x_j$, $x_k$, and so on (i≠j≠k and so on) is defined by the following Expression (8).

$$\Delta E_{ijk\ldots} = -\Delta x_i h_i - \Delta x_j h_j^{(i)} - \Delta x_k h_k^{(ij)} - \ldots \qquad (8)$$

Local fields $h_j^{(i)}$ and $h_k^{(ij)}$ in Expression (8) are obtained by the following Expression (9).

$$\begin{array}{ll}
\text{FLIP OF} & h_1, h_2, \ldots, h_N + \\
\text{VARIABLE } x_i & \underline{\Delta x_i(W_{i1}, W_{i2}, \ldots, W_{iN})} \\
\text{SUBSEQUENT} & h_1^{(i)}, h_2^{(i)}, \ldots, h_N^{(i)} + \\
\text{FLIP OF} & \underline{\Delta x_j(W_{j1}, W_{j2}, \ldots, W_{jN})} \\
\text{VARIABLE } x_j & h_1^{(ij)}, h_2^{(ij)}, \ldots, h_N^{(ij)}
\end{array} \qquad (9)$$

Note that $h_j^{(i)}$ and $h_k^{(ij)}$ are individually represented as follows: $h_j^{(i)} = h_j + \Delta x_i W_{ij}$; and $h_k^{(ij)} = h_k + \Delta x_i W_{ik} + \Delta x_j W_{jk}$. Therefore, a change in energy caused, for example, by sequential flips of the variables $x_i$, $x_j$, and $x_k$ (i.e., a change in energy associated with a transition to a 3-Hamming distance neighborhood state) is calculated based on the values of the variables $x_i$, $x_j$, and $x_k$ before the flips, weight values $W_{ij}$, $W_{ik}$, and $W_{jk}$, and local fields $h_i$, $h_j$, and $h_k$. Next described is an exemplary computing unit for calculating changes in energy each associated with a transition to a 3-Hamming distance neighborhood state.

Figure 6:
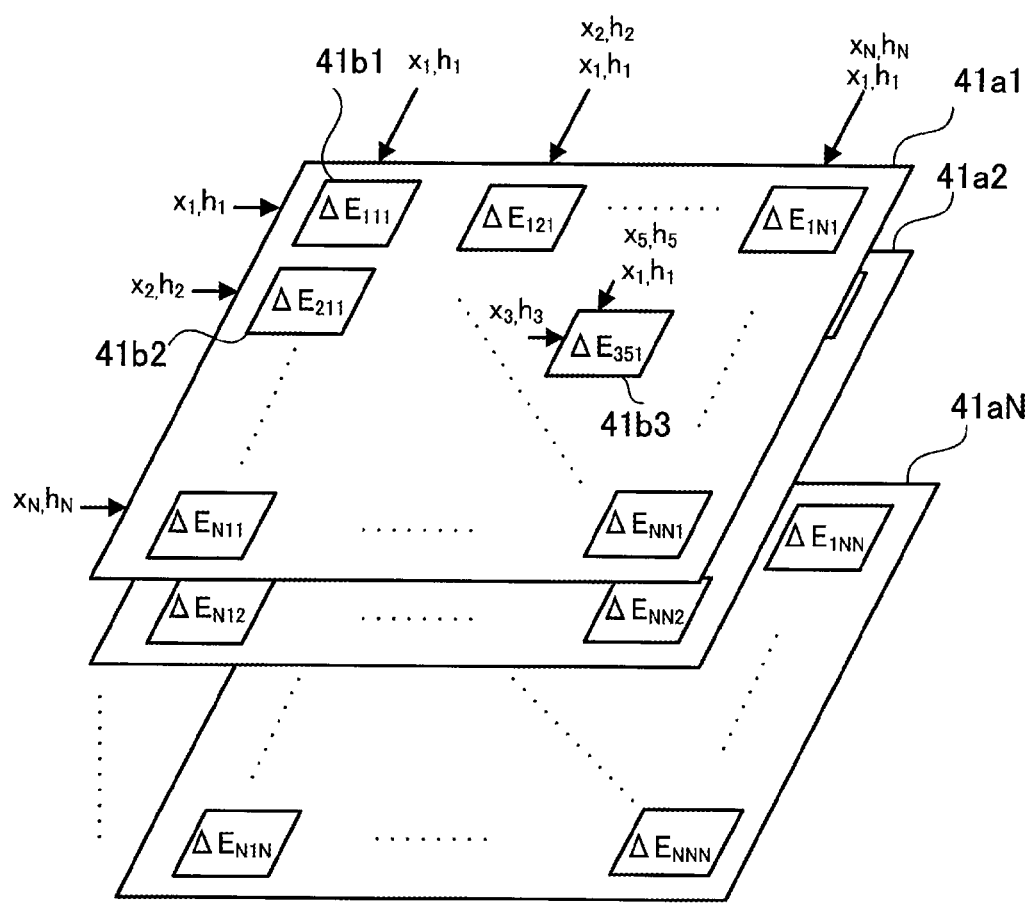
FIG. 6 illustrates an exemplary computing unit for calculating changes in energy each associated with a transition to a 3-Hamming distance neighborhood state.

FIG. 6 illustrates an exemplary computing unit for calculating changes in energy each associated with a transition to a 3-Hamming distance neighborhood state.

A computing unit 40 includes $N^3$ calculation circuits individually calculating one of changes in energy $\Delta E_{111}$ to $\Delta E_{NNN}$ arranged, for example, in a three-dimensional array, as depicted in FIG. 6.

Amongst N calculation circuit groups 41a1, 41a2, ..., and 41aN, the calculation circuit group 41a1 includes N-by-N calculation circuits (such as calculation circuits 41b1, 41b2, and 41b3) for individually calculating a change in energy $\Delta E_{ij1}$ caused by sequential flips of the variables $x_i$, $x_j$, and $x_l$. To the individual N-by-N calculation circuits, the following pairs of a variable and a local field are read from the retaining unit 11a depicted in FIG. 1: the variable $x_i$, which is flipped first, and the local field $h_i$; the variable $x_j$, which is flipped second, and the local field $h_j$; and the variable $x_1$, which is flipped last of all, and the local field $h_1$.

For example, the calculation circuit 41b3 calculates a change in energy $\Delta E_{351}$ using the values of variables $x_1$, $x_3$, and $x_5$ and local fields $h_1$, $h_3$, and $h_5$. Using Expression (8), the following is obtained: $\Delta E_{351} = -\Delta x_3 h_3 - \Delta x_5 h_5^{(3)} - \Delta x_1 h_1^{(35)}$. Note that $h_5^{(3)}$ and $h_1^{(35)}$ are individually represented as follows: $h_5^{(3)} = h_5 + \Delta x_3 W_{35}$; and $h_1^{(35)} = h_1 + \Delta x_3 W_{31} + \Delta x_5 W_{51}$. Therefore, retention of weight values $W_{31}$, $W_{35}$, and $W_{51}$ allows the calculation circuit 41b3 to calculate the change in energy $\Delta E_{351}$ from the values of the variables $x_1$, $x_3$, and $x_5$ and the local fields $h_1$, $h_3$, and $h_5$.

The remaining calculation circuit groups 41a2 to 41aN individually include N-by-N calculation circuits and calculate changes in energy $\Delta E_{ij2}$ to $\Delta E_{ijN}$.

Note that a change in energy $\Delta E_{ijk}$ (i=j=k) is equal to the change in energy $\Delta E_i$ caused when only a single variable $x_i$ is flipped once. Therefore, a circuit for calculating the change in energy $\Delta E_i = -\Delta x_i h_i$ may be used as a calculation circuit for obtaining the change in energy $\Delta E_{ijk}$ (i=j=k). For example, a circuit for calculating $\Delta E_1 = -\Delta x_1 h_1$ is used as the calculation circuit 41b1 for calculating a change in energy $\Delta E_{111}$.

Note also that each change in energy $\Delta E_{ijk}$ (i=j≠k or i≠j=k) is equal to a change in energy $\Delta E_k$ caused when only a single variable $x_k$ is flipped once. In the case where circuits have already been provided for calculating the changes in energy $\Delta E_i$ each associated with a transition to a 1-Hamming distance neighborhood state, circuits for calculating changes in energy each associated with a transition to a 2-Hamming distance neighborhood state may be installed in place of calculation circuits for calculating the changes in energy $\Delta E_{ijk}$ (i=j≠k or i≠j=k). For example, a circuit for calculating $\Delta E_{21} = -\Delta x_2 h_2 - \Delta x_1 h_1 - \Delta x_2 \cdot \Delta x_1 \cdot W_{21}$ may be used as the calculation circuit 41b2 for calculating the change in energy $\Delta E_{211}$.

The optimization apparatus according to the third embodiment includes, in place of the aforementioned update bit selection circuit 12, an update bit selection circuit for outputting identification information of three bits for which update is accepted, based on the magnitude relationship between the individual $N^3$ changes in energy $\Delta E_{ijk}$ to $\Delta E_{ijk}$ and the thermal excitation energy. A selector included in such an update bit selection circuit is implemented using, for example, an $N^3$-to-1 selector described below.

Figure 7:
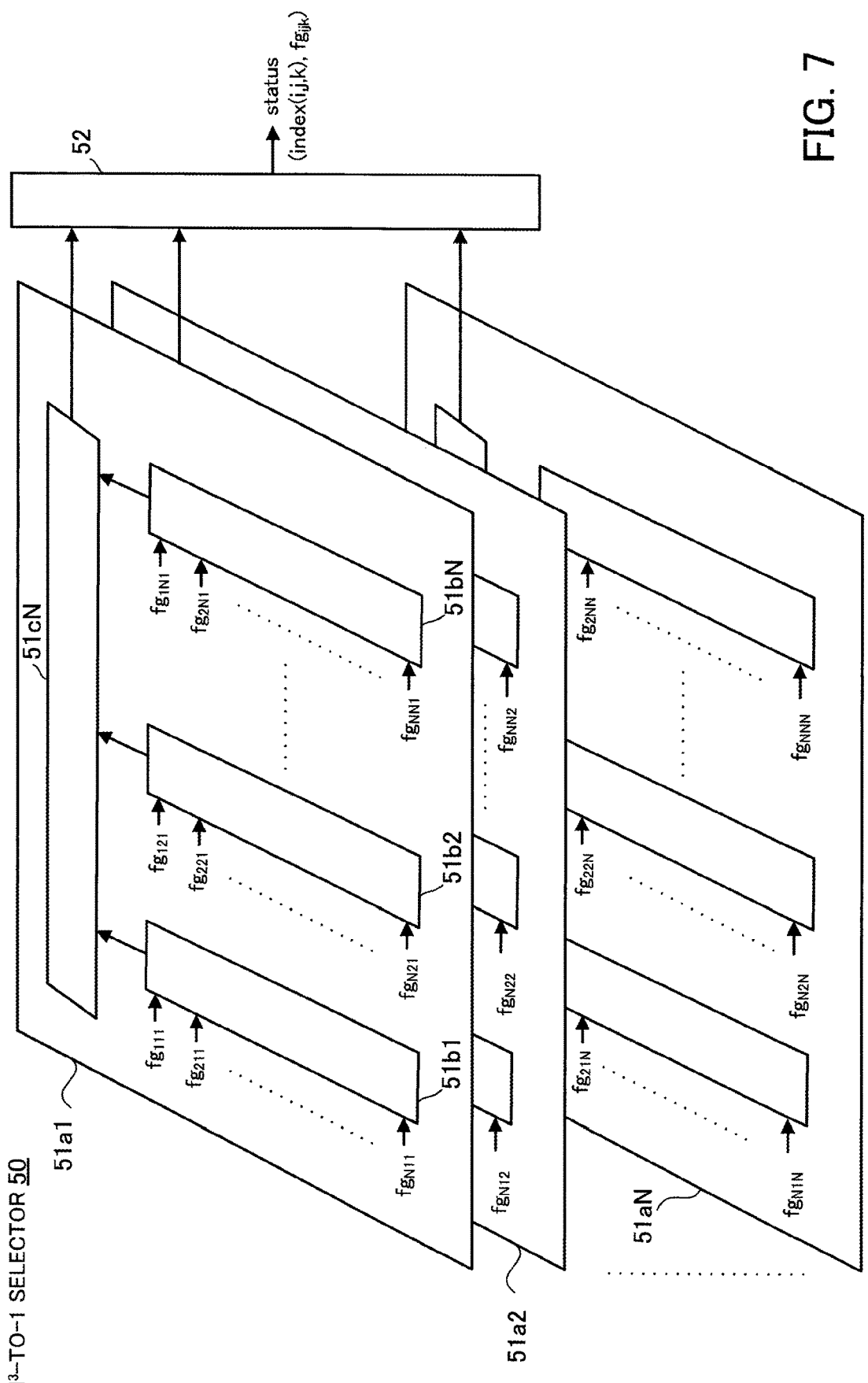
FIG. 7 illustrates an exemplary $N^3$-to-1 selector of an optimization apparatus according to a third embodiment.

FIG. 7 illustrates an exemplary $N^3$-to-1 selector of the optimization apparatus according to the third embodiment.

An $N^3$-to-1 selector 50 preferentially selects one flag having a value of 1 amongst $N^3$ flags $fg_{111}$ to $fg_{NNN}$ each indicating the acceptance or rejection of a state transition causing a corresponding change in energy $\Delta E_{111}$ to $\Delta E_{NNN}$. Then, the $N^3$-to-1 selector 50 outputs a status signal (status) including a flag $fg_{ijk}$ selected and identification information (index(i, j, k)) corresponding to the flag $fg_{ijk}$.

The $N^3$-to-1 selector 50 includes selector groups 51a1, 51a2, . . . , and 51aN and an N-to-1 selector 52.

Each of the selector groups 51a1 to 51aN preferentially selects one flag having a value of 1 amongst N-by-N flags and then outputs the selected flag and identification information corresponding to the flag. The selector group 51a1 includes, for example, N-to-1 selectors 51b1, 51b2, . . . , and 51bN, and 51cN.

Each of the N-to-1 selectors 51b1 to 51bN preferentially selects one flag having a value of 1 amongst N flags and then outputs the selected flag and identification information corresponding to the flag. The N-to-1 selector 51b1, for example, preferentially selects one flag having a value of 1 amongst flags $fg_{i11}$ (i=1 to N) individually associated with changes in energy $\Delta E_{i11}$ (i=1 to N) and then outputs the selected flag and identification information corresponding to the flag. Note that in the case where all the flags $fg_{i11}$ are set to 0, the flag output from the N-to-1 selector 51b1 also has a value of 0.

The N-to-1 selector 51cN preferentially selects one flag having a value of 1 amongst the flags output from the N-to-1 selectors 51b1 to 51bN and then outputs the selected flag and identification information corresponding to the flag. In the case where the flags output from the N-to-1 selectors 51b1 to 51bN are all set to 0, the flag output from the N-to-1 selector 51cN also has a value of 0.

The remaining selector groups 51a2 to 51aN individually have the same configuration as that of the selector group 51a1.

The N-to-1 selector 52 preferentially selects one flag having a value of 1 from flags individually output from the selector groups 51a1 to 51aN and outputs a status signal (status) including the selected flag $fg_{ijk}$ and identification information (index(i, j, k)) corresponding to the flag $fg_{ijk}$.

Although not illustrated in the accompanying figures, the update circuit of the optimization apparatus according to the third embodiment flips the variables $x_i$, $x_j$, and $x_k$ identified by the identification information (index(i, j, k)) when the flag $fg_{ijk}$ has a value of 1. In addition, based on the flips, the update circuit updates the values of the local fields $h_1$ to $h_N$.

With use of the computing unit 40 and the $N^3$-to-1 selector 50 described above, it is possible to implement an optimization apparatus capable of exploring 3-Hamming distance neighborhood states. Using an augmentation technique similar to that described above, it is possible to implement an optimization apparatus capable of further expanding the search space, allowing exploring states of a neighborhood based on a Hamming distance of four or more although the explanation thereof is omitted here.

Note that $N^n$ calculation circuits (n=3 in the case of the optimization apparatus of the third embodiment) may calculate values of local fields associated with sequential flips of n−1 bits when n bits are flipped in sequence.

For example, the $N^3$ calculation circuits of the optimization apparatus according to the third embodiment may calculate the values of local fields $h_1^{(ij)}, \ldots,$ and $h_N^{(ij)}$ represented by Expression (9), that is, the values of local fields associated with sequential flips of two bits. In the same manner as done by the update circuit 32 of the optimization apparatus 30 according to the second embodiment, an update circuit (not illustrated) of the optimization apparatus according to the third embodiment uses the local fields $h_1^{(ij)}$ to $h_N^{(ij)}$ when updating the local fields $h_1$ to $h_N$, to thereby reduce memory access.

(d) Fourth Embodiment

Figure 8:
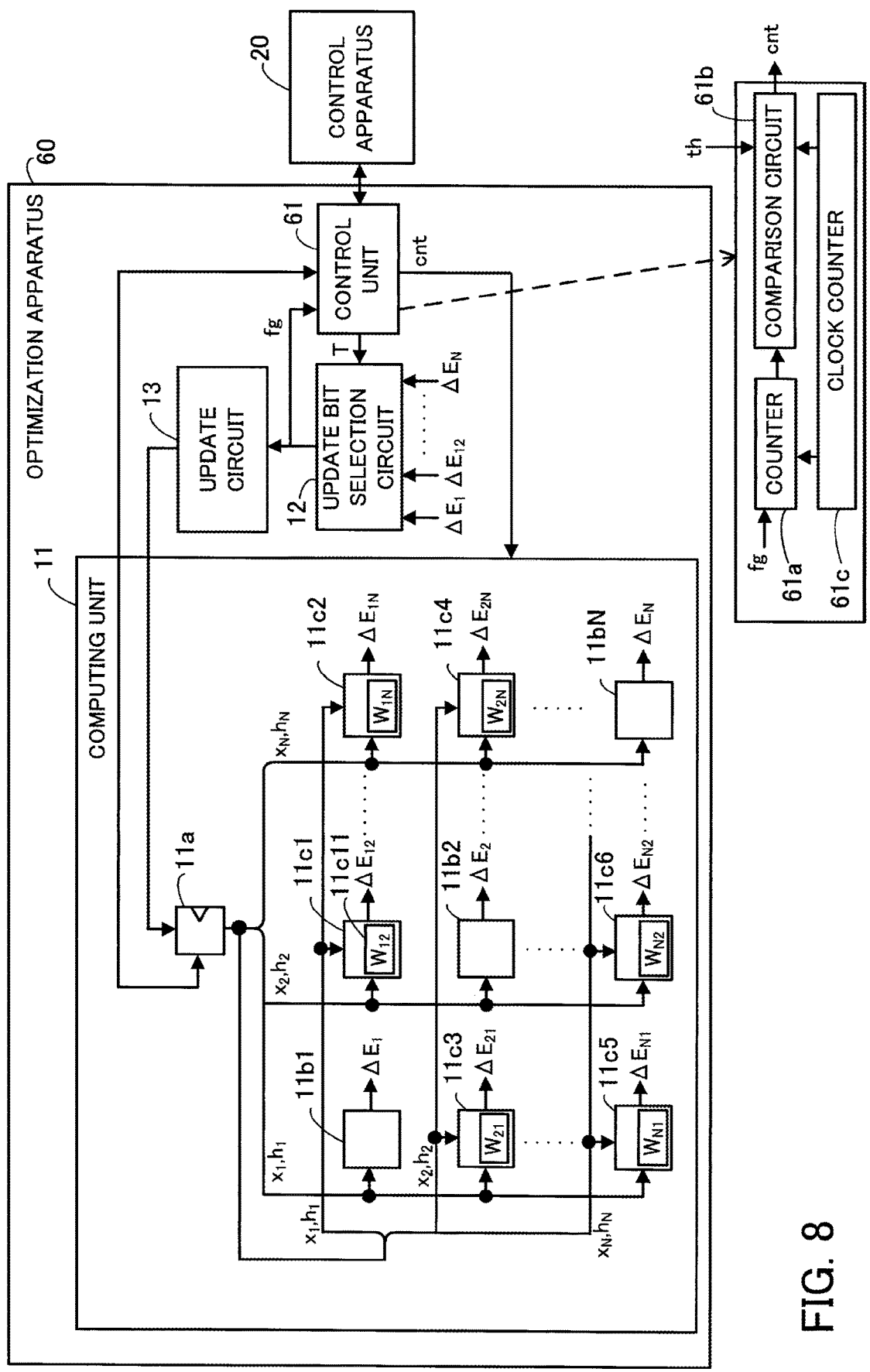
FIG. 8 illustrates an exemplary optimization apparatus according to a fourth embodiment.

FIG. 8 illustrates an exemplary optimization apparatus according to a fourth embodiment.

In an optimization apparatus 60 according to the fourth embodiment, a control unit 61 has a function of switching (ON or OFF) a search function for exploring 2-Hamming distance neighborhood states, in addition to functions similar to those of the control unit 14 according to the first embodiment.

For example, the control unit 61 includes a counter 61a, a comparison circuit 61b, and a clock counter 61c, as illustrated in FIG. 8.

The counter 61a counts the number of times that a flag fg output from the update bit selection circuit 12 is 1 (i.e., the number of updates).

The comparison circuit 61b supplies, to the computing unit 11, a control signal cnt to turn off the search function for exploring 2-Hamming distance neighborhood states if the count value of the counter 61a is greater than or equal to a predetermined threshold th supplied from the control apparatus 20. When the count value of the counter 61a is less than the predetermined threshold th, on the other hand, the comparison circuit 61b supplies, to the computing unit 11, a control signal cnt to turn on the search function for exploring 2-Hamming distance neighborhood states.

The clock counter 61c counts clock signals (not illustrated), and brings the comparison circuit 61b into an enabled state each time the count reaches a predetermined number and then resets the counter 61a.

That is, the control unit 61 turns off the search function for exploring 2-Hamming distance neighborhood states when the number of bit updates over a predetermined time period is greater than or equal to the threshold th.

The control signal cnt is supplied, for example, to off-diagonal calculation circuits, i.e., those other than the calculation circuits 11b1 to 11bN on the diagonal, amongst the N-by-N calculation circuits of the computing unit 11. When the control signal cnt indicating turning off of the search function for exploring 2-Hamming distance neighborhood states is supplied, the function of calculating the changes in energy $\Delta E_{ij}$ is disabled. In this case, no exploration of 2-Hamming distance neighborhood states is performed, and exploration of 1-Hamming distance neighborhood states is performed.

When updates take place frequently, the search speed does not slow down without exploration of 2-Hamming distance neighborhood states. Therefore, in the case where the number of updates over a predetermined time period is greater than or equal to the threshold th, as described above, the search function for exploring 2-Hamming distance neighborhood states is turned off, which leads to a reduction in power consumption by the optimization apparatus 60.

Figure 9:
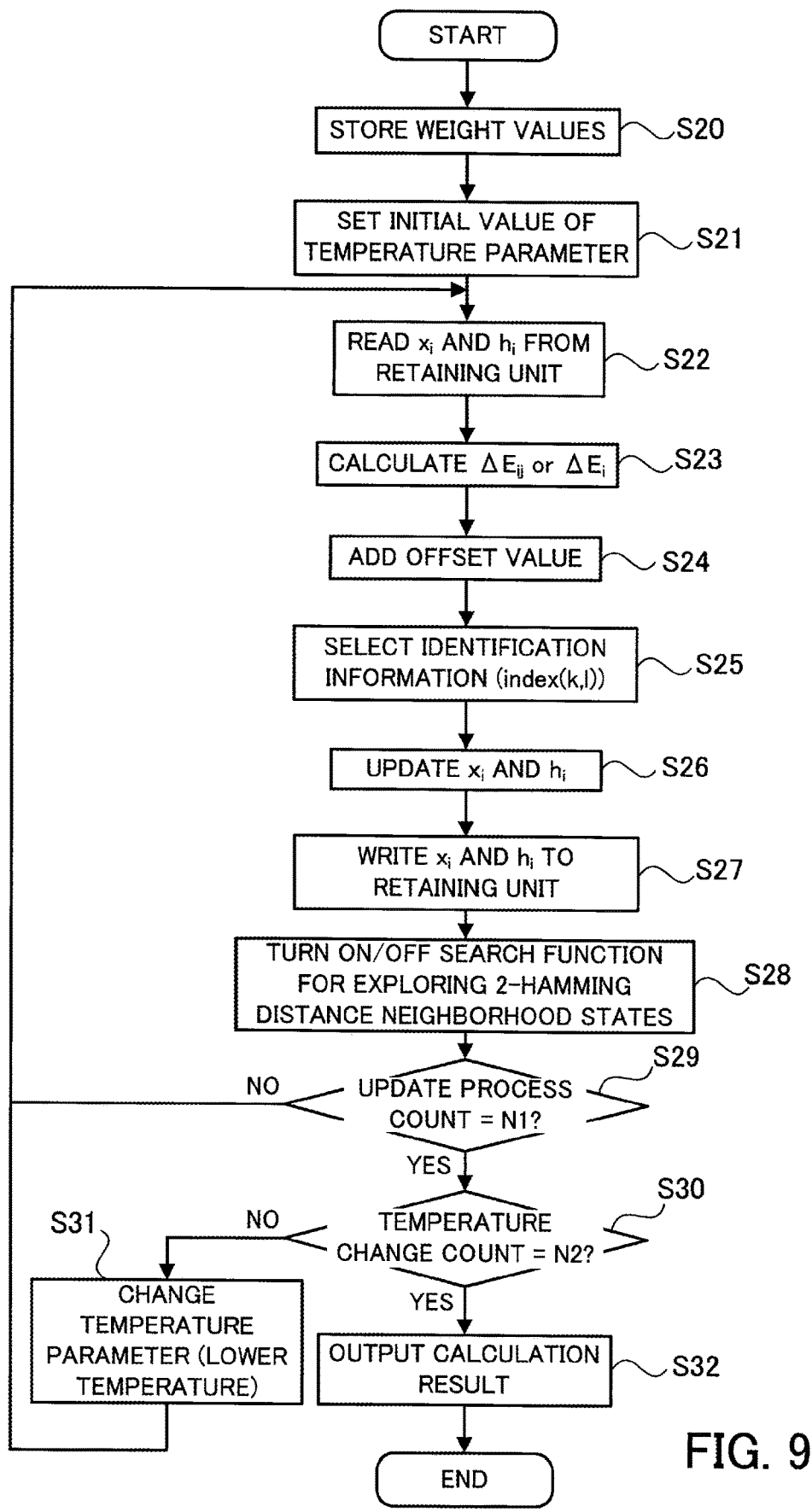
FIG. 9 is a flowchart illustrating an exemplary operation flow of the optimization apparatus according to the fourth embodiment.

FIG. 9 is a flowchart illustrating an exemplary operation flow of the optimization apparatus according to the fourth embodiment.

The procedure of steps S20 to S27 is the same as that of steps S1 to S8 in FIG. 4. According to the example of FIG. 9, in step S28, the control unit 61 performs a switching operation to turn on or off the above-described search function for exploring 2-Hamming distance neighborhood states. Note that step S28 takes place only when the comparison circuit 61b is placed into an enabled state, as described above, and thus is not carried out every time in each iteration.

In the case where the search function for exploring 2-Hamming distance neighborhood states is turned off, no calculation of $\Delta E_{ij}$ takes place in the subsequent step S23.

The procedure of steps S29 to S32 is the same as that of steps S9 to S12 in FIG. 4.

The above-described optimization apparatus 60 of the fourth embodiment achieves the same effect as the optimization apparatus 10 of the first embodiment, and further allows a reduction in power consumption when the number of updates over a predetermined time period is greater than or equal to the threshold th, as described above.

Note that the above-described control unit 61 having the function of switching (ON or OFF) the search function for exploring 2-Hamming distance neighborhood states may be applied to the optimization apparatus 30 of the second embodiment. In addition, it is possible to provide a control unit (not illustrated) of the optimization apparatus according to the third embodiment with a function of switching (ON or OFF) a search function for exploring 3-Hamming distance neighborhood states.

Each of the control units 14 and 61 of the optimization apparatuses according to the first to fourth embodiments (such as the optimization apparatuses 10, 30, and 60) may be an electronic circuit designed for specific use, such as an ASIC or FPGA, or a processor, as described above, or may be included in the control apparatus 20.

In the case where the control unit 14 or 61 is included in the control apparatus 20 (e.g. a personal computer (PC)), the functions of the control unit 14 or 61 are implemented by a processor of the control apparatus 20 executing a control program.

Figure 10:
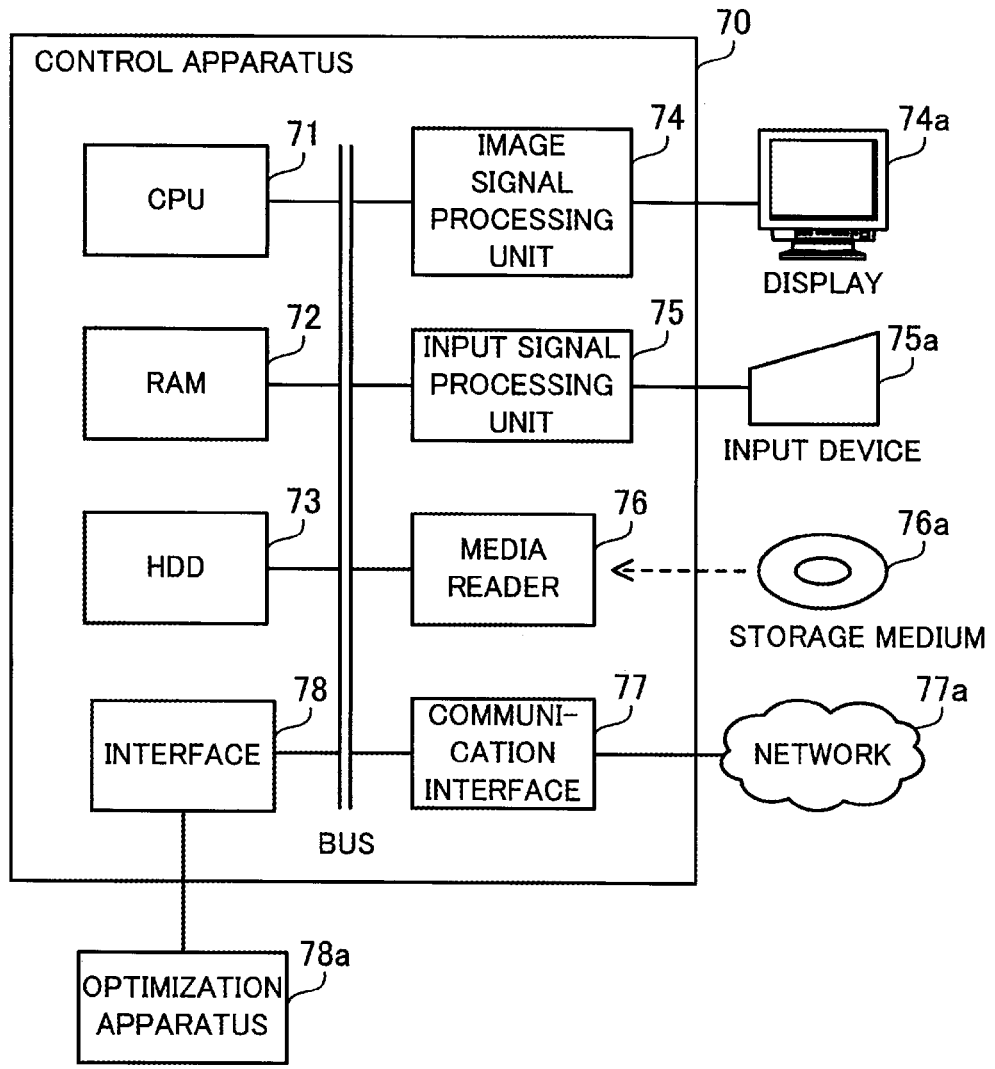
FIG. 10 is a block diagram illustrating exemplary hardware of a control apparatus.

FIG. 10 is a block diagram illustrating exemplary hardware of a control apparatus.

A control apparatus 70 includes a CPU 71, a RAM 72, a hard disk drive (HDD) 73, an image signal processing unit 74, an input signal processing unit 75, a media reader 76, a communication interface 77, and an interface 78. These individual units are connected to a bus.

The CPU 71 is a processor including a computing circuit for carrying out program instructions. The CPU 71 reads out at least part of programs (for example, the aforementioned control program) and data stored in the HDD 73, loads them into the RAM 72, and executes the loaded programs. Note that the CPU 71 may include two or more processor cores and the control apparatus 70 may include two or more processors, and the above-described processes may be executed in parallel using these processors or processor cores.

The RAM 72 is volatile semiconductor memory for temporarily storing therein programs to be executed by the CPU 71 and data to be used by the CPU 71 for its computation. Note that the control apparatus 70 may be provided with a different type of memory other than RAM, or may be provided with two or more memory devices.

The HDD 73 is a non-volatile memory device to store therein software programs, such as an operating system (OS), middleware, and application software, as well as various types of data. The programs include, for example, a control program for causing the control apparatus 70 to implement the above-described operation of the control unit 14 or 61. Note that the control apparatus 70 may be provided with a different type of memory device, such as flash memory or a solid state drive (SSD), or may be provided with two or more non-volatile memory devices.

The image signal processing unit 74 produces video images (for example, images with the calculation result of an optimization problem) in accordance with drawing commands from the CPU 71 and displays them on a screen of a display 74a coupled to the control apparatus 70. The display 74a may be any type of display, such as a cathode ray tube (CRT) display; a liquid crystal display (LCD); a plasma display panel (PDP); or an organic electro-luminescence (OEL) display.

The input signal processing unit 75 receives an input signal from an input device 75a connected to the control apparatus 70 and supplies the input signal to the CPU 71. Various types of input devices may be used as the input device 75a, for example, a pointing device, such as a mouse, a touch panel, a touch-pad, or a trackball; a keyboard; a remote controller; or a button switch. A plurality of types of input devices may be connected to the control apparatus 70.

The media reader 76 is a reader for reading programs and data recorded in a storage medium 76a. As the storage medium 76a, any of the following may be used: a magnetic disk, an optical disk, a magneto-optical disk (MO), and a semiconductor memory. Examples of the magnetic disk are a flexible disk (FD) and a HDD. Examples of the optical disk are a compact disc (CD) and a digital versatile disc (DVD).

The media reader 76 copies programs and data read from the storage medium 76a to a different storage medium, for example, the RAM 72 or the HDD 73. The read programs are executed, for example, by the CPU 71. Note that the storage medium 76a may be a portable storage medium, and may be used to distribute the programs and data. The storage medium 76a and the HDD 73 are sometimes referred to as computer-readable storage media.

The communication interface 77 is connected to a network 77a and communicates with different information processors via the network 77a. The communication interface 77 may be a wired communication interface connected via a cable to a communication device, such as a switch, or may be a wireless communication interface connected via a wireless link to a base station.

The interface 78 communicates with an optimization apparatus 78a. In the case where the control apparatus 70 implements the functions of the aforementioned control unit 14 or 61, the optimization apparatus 78a is configured, for example, as an apparatus formed by excluding the control units 14 and 61 from the optimization apparatuses 10 and 60 of FIGS. 1 and 9, respectively.

Figure 11:
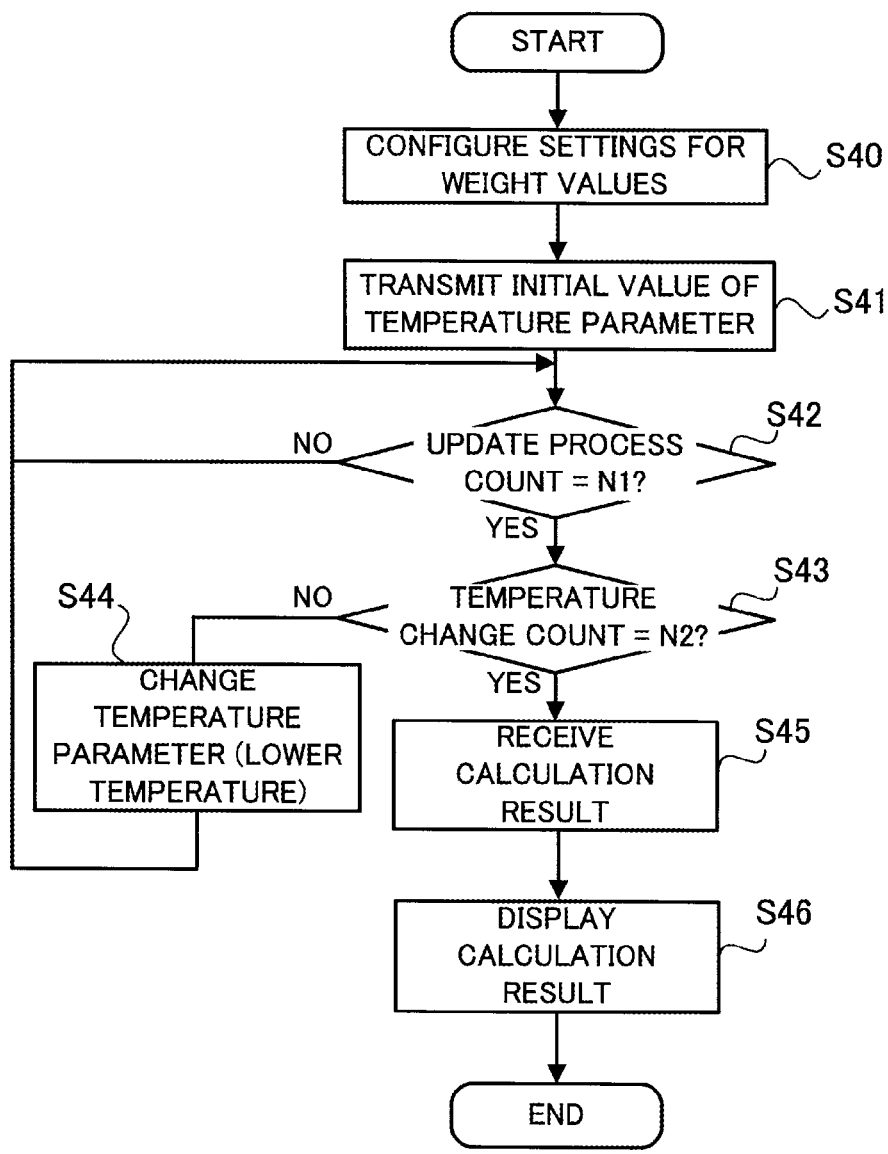
FIG. 11 is a flowchart illustrating a procedure taken by the control apparatus to control the optimization apparatus.

FIG. 11 is a flowchart illustrating a procedure taken by a control apparatus to control an optimization apparatus.

The control apparatus 70 configures the settings for weight values (step S40). In step S40, the control apparatus 70 transmits weight values to the optimization apparatus 78a and causes the off-diagonal calculation circuits of the computing unit 11 of FIG. 1 to store the individual weight values therein.

In addition, the control apparatus 70 transmits an initial value of the temperature parameter T to the optimization apparatus 78a (step S41).

Subsequently, the control apparatus 70 receives, for example, a signal transmitted each time the optimization apparatus 78a has performed the aforementioned update process, and then determines whether the update process has been repeated the predetermined number of times N1 (step S42). If the update process has yet to be repeated the predetermined number of times N1, the operation returns to step S42 to be repeated.

If the update process has been repeated the predetermined number of times N1, the control apparatus 70 determines whether the number of changes in the temperature parameter T (temperature change count) has reached the predetermined number N2 (step S43).

If the temperature change count has yet to reach the predetermined number N2, the control unit 70 changes the temperature parameter T (lowers the temperature) (step S44). In step S44, the control apparatus 70 transmits, to the optimization apparatus 78a, a value of the temperature parameter T smaller than the last transmitted one. The predetermined number of times N1, the predetermined number N2, and how to change the temperature parameter (e.g. the decrement level of the temperature in each change) are determined based on the annealing conditions. After step S44, the operation returns to step S42 to be repeated.

If the temperature change count reaches the predetermined number N2, the control unit 70 receives the value of each bit (the variables $x_i$ (i=1 to N)) at this point of time from the optimization apparatus 78a as a calculation result of the optimization problem (step S48).

Subsequently, the control apparatus 70 presents the received calculation result, for example, on the display 74a of FIG. 10 (step S46), and then ends the control of the optimization apparatus 78a.

Note that the aforementioned operation of the control apparatus 70 is implemented by causing a computer to execute a program, as described above.

Such a program may be recorded in a computer-readable storage medium (for example, the storage medium 76a). Examples of such a computer-readable storage medium include a magnetic disk, an optical disk, a magneto-optical disk, and semiconductor memory. Examples of the magnetic disk are a FD and a HDD. Examples of the optical disk are a compact disc (CD), CD-recordable (CD-R), CD-rewritable (CD-RW), DVD, DVD-R, and DVD-RW. The program may be recorded on portable storage media and then distributed. In such a case, the program may be executed after being copied from such a portable storage medium to a different storage medium (for example, the HDD 53).

According to one aspect, it is possible to prevent slowdown in the speed of searching for an optimal solution.

As stated above, an optimization apparatus, a method for controlling an optimization apparatus, and a program for controlling an optimization apparatus have been described with reference to the embodiments, by way of example, and they are not limited to the one described as above.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An optimization apparatus comprising:
    a plurality of first calculation circuits each configured to calculate a first change in energy of an Ising model, onto which a computational problem is mapped, based on first local field values each associated with one of n bits, n is an integer greater than or equal to 2, amongst a plurality of bits corresponding to a plurality of spins in the Ising model, values of the n bits, and one or more weight values representing strength of interaction among the n bits, the first change in energy being caused by changes in the values of the n bits;
    an update bit selection circuit configured to select the n bits for which value update is accepted, based on a magnitude relationship between thermal excitation energy, which is determined based on a temperature parameter input thereto and a random number, and each of the first changes in energy output from the plurality of first calculation circuits, and output first identification information for identifying the selected n bits; and
    an update circuit configured to change the values of the n bits identified by the first identification information output from the update bit selection circuit, and also update, based on the changes in the values of the n bits, second local field values including the first local field values and each associated with one of the plurality of bits.

2. The optimization apparatus according to claim 1, wherein:
    each of the plurality of first calculation circuits includes a storing unit for storing the one or more weight values.

3. The optimization apparatus according to claim 1, further comprising:
    a plurality of second calculation circuits each configured to calculate a second change in energy of the Ising model, based on a third local field value associated with a single bit amongst the plurality of bits and a value of the single bit, the second change in energy being caused by a change in the value of the single bit,
    wherein the update bit selection circuit selects the n bits or the single bit for which value update is accepted, based on a magnitude relationship between the thermal excitation energy and each of the first changes in energy output from the plurality of first calculation circuits and the second changes in energy output from the plurality of second calculation circuits, and outputs the first identification information for identifying the selected n bits or second identification information for identifying the selected single bit, and the update circuit changes the values of the n bits identified by the first identification information or the value of the single bit identified by the second identification information, and also updates, based on the changes in the values of the n bits or the change in the value of the single bit, the second local field values including the first local field values or the third local field value and each associated with one of the plurality of bits.

4. The optimization apparatus according to claim 3, further comprising:

a control unit configured to disable functions of the plurality of first calculation circuits when an update count of the n bits over a predetermined time period is greater than or equal to a threshold.

5. The optimization apparatus according to claim 1, wherein:

each of the plurality of first calculation circuits calculates the first change in energy of the Ising model, caused by sequential changes in the values of the n bits, and the update circuit sequentially changes the values of the n bits identified by the first identification information output from the update bit selection circuit, and also updates, based on the sequential changes in the values of the n bits, the second local fields values including the first local field values and each associated with one of the plurality of bits.

6. The optimization apparatus according to claim 1, wherein:

each of the plurality of first calculation circuits calculates updated values of the first local field values, obtained by changes in values of (n−1) bits amongst the n bits, and the update circuit selects, based on the first identification information, one of the updated values individually calculated by the plurality of first calculation circuits, and updates the second local field values using the selected updated value.

7. The optimization apparatus according to claim 6, wherein:

each of the plurality of first calculation circuits calculates updated values of the first local field values, obtained by sequential changes in the values of (n−1) bits amongst the n bits.

8. A method for controlling an optimization apparatus, the method comprising:

configuring, by a control apparatus, settings for weight values on the optimization apparatus; and controlling, by the control apparatus, magnitude of a temperature parameter on the optimization apparatus, wherein the optimization apparatus includes:

a plurality of first calculation circuits each configured to calculate a first change in energy of an Ising model, onto which a computational problem is mapped, based on first local field values each associated with one of n bits, n is an integer greater than or equal to 2, amongst a plurality of bits corresponding to a plurality of spins in the Ising model, values of the n bits, and the weight values representing strength of interaction among the n bits, the first change in energy being caused by changes in the values of the n bits, an update bit selection circuit configured to select the n bits for which value update is accepted, based on a magnitude relationship between thermal excitation energy, which is determined based on the temperature parameter input thereto and a random number, and each of the first changes in energy output from the plurality of first calculation circuits, and output first identification information for identifying the selected n bits, and an update circuit configured to change the values of the n bits identified by the first identification information output from the update bit selection circuit, and also update, based on the changes in the values of the n bits, second local field values including the first local field values and each associated with one of the plurality of bits.

9. A non-transitory computer-readable recording medium storing therein a computer program that causes a computer to execute a process comprising:

configuring settings for weight values on an optimization apparatus; and controlling magnitude of a temperature parameter on the optimization apparatus, wherein the optimization apparatus includes:

a plurality of first calculation circuits each configured to calculate a first change in energy of an Ising model, onto which a computational problem is mapped, based on first local field values each associated with one of n bits, n is an integer greater than or equal to 2, amongst a plurality of bits corresponding to a plurality of spins in the Ising model, values of the n bits, and the weight values representing strength of interaction among the n bits, the first change in energy being caused by changes in the values of the n bits, an update bit selection circuit configured to select the n bits for which value update is accepted, based on a magnitude relationship between thermal excitation energy, which is determined based on the temperature parameter input thereto and a random number, and each of the first changes in energy output from the plurality of first calculation circuits, and output first identification information for identifying the selected n bits, and an update circuit configured to change the values of the n bits identified by the first identification information output from the update bit selection circuit, and also update, based on the changes in the values of the n bits, second local field values including the first local field values and each associated with one of the plurality of bits.

* * * * *